United States Patent [19]

Nishiyama et al.

[11] Patent Number: 5,188,908

[45] Date of Patent: Feb. 23, 1993

[54] AL₂O₃ BASED CERAMICS

[75] Inventors: Akio Nishiyama; Takashi Koyama; Yasutaka Aikawa; Hideo Ohshima, all of Omiya; Yuichiro Terao, Tokyo; Munenori Kato, Tokyo; Akio Sakai, Tokyo, all of Japan

[73] Assignee: Mitsubishi Materials Corporation, Tokyo, Japan

[21] Appl. No.: 658,914

[22] Filed: Feb. 22, 1991

[30] Foreign Application Priority Data

Feb. 23, 1990 [JP] Japan .................................. 2-42979
Apr. 5, 1990 [JP] Japan .................................. 2-90783
Sep. 4, 1990 [JP] Japan .................................. 2-234125
Nov. 26, 1990 [JP] Japan .................................. 2-321463

[51] Int. Cl.⁵ ...................... C04B 35/56; C04B 35/58
[52] U.S. Cl. ...................... 428/698; 501/87; 501/96; 501/98; 501/105; 501/127
[58] Field of Search ............... 501/87, 96, 98, 105, 501/127, 128, 153; 51/307, 309

[56] References Cited

U.S. PATENT DOCUMENTS

| | | | |
|---|---|---|---|
| 4,218,253 | 8/1982 | Dworak et al. | 501/97 |
| 4,331,048 | 5/1982 | Dworak et al. | 501/105 |
| 4,366,254 | 12/1982 | Rich et al. | 501/96 |
| 4,424,066 | 1/1984 | Sarin et al. | 501/98 |
| 4,426,209 | 1/1984 | Sarin et al. | 501/98 |
| 4,515,746 | 5/1985 | Brun et al. | |
| 4,731,349 | 3/1988 | Lee et al. | |
| 4,745,091 | 5/1988 | Landingham | 501/96 |
| 4,804,645 | 2/1989 | Elkstrom | 501/96 |
| 4,852,999 | 8/1989 | Mehrotra et al. | 51/309 |

FOREIGN PATENT DOCUMENTS

| | | | |
|---|---|---|---|
| WO81/01143 | 4/1981 | European Pat. Off. | |
| 2744700 | 4/1979 | Fed. Rep. of Germany | 501/96 |
| 0017978 | 2/1981 | Japan | 501/98 |

OTHER PUBLICATIONS

World Patents Index (Latest), Accession Number 85-201252 (Week 33) of JP 60-127905 (NGK Spark Plug KK), Aug. 7, 1985. London, GB.
World Patents Index, Accession Number 78-90310A (Week 50) of JP-53 127514 (Sumitomo Elec. Ind KK), Jul. 11, 1978. London, GB.
Patent Abstracts of Japan of JP-A-02 034557 (Toshiba Tungaloy Co Ltd., Feb. 5, 1990.
Young-Wook Kim et al, "Pressureless Sintering of Alumina-Titanium Carbide Composites". *Journal of the American Ceramic Society*, vol. 72, No. 8, pp. 1333-1337; Aug. 1989, Westerville, Ohio, USA.

*Primary Examiner*—Mark L. Bell
*Assistant Examiner*—Paul Marcantoni
*Attorney, Agent, or Firm*—Armstrong, Westerman, Hattori, McLeland & Naughton

[57] ABSTRACT

There is disclosed an $Al_2O_3$ based ceramic which includes 5% to 50% by weight of a hard dispersed phase of at least one compound selected from metal carbide, metal nitride, metal carbonitride, metal oxy-carbide, metal oxy-nitride and metal carbo-oxy-nitride. The compound is represented by M(CNO), wherein M is at least one metal selected from the group consisting of Ti, Zr and Hf. The ceramic contains no greater than 25% by weight of $ZrO_2$, and balance $Al_2O_3$ matrix. which contains an additive dissolved in the $Al_2O_3$ grains so as to form solid solution therewith. The additive is contained in an amount of 0.01% to 12% by weight with respect to the $Al_2O_3$ matrix and is at least one oxide of an element selected from the group consisting of Y, Mg, Cr, Ni, Co, and rare earth elements. The $Al_2O_3$ grains have an average grain size no larger than 1.0 μm while the hard phase constituent has an average grain size no larger than 0.6 μm.

10 Claims, No Drawings

AL₂O₃ BASED CERAMICS

BACKGROUND OF THE INVENTION

1. Field of the Invention

The present invention pertains to an aluminum oxide ($Al_2O_3$) based ceramic which has great strength and toughness, and exhibits excellent performance when used in cutting tools under severe conditions.

2. Prior Art

Japanese Patent Application laid open with Publication No. 53-118410 describes a conventional $Al_2O_3$ based ceramic which is manufactured by the following method. First, $Al_2O_3$ powder, powders of metal oxides and powders of hard dispersed phase constituents are prepared as starting powders. The metal oxides serving as the binder phase constituents are selected from those of yttrium (Y), magnesium (Mg), chromium (Cr), cobalt (Co), nickel (Ni) and rare earth elements (abbreviated to R), while the hard dispersed phase constituents are carbides (MC), nitrides (MN), carbo-nitrides (MCN), oxy-carbides (MCO), oxy-nitrides (MNO), oxy-carbo-nitrides (MCNO) of the metals (M) of the Group IVa of the Periodic Table (hereinafter referred to as M(CNO)). No more than 10% by weight of one or more metal oxide powders, 10 to 90% by weight of one or more M(CNO) powders, and balance $Al_2O_3$, are blended and compacted into a green compact under conventional conditions. Thereafter, the compact is subjected to hot pressing at a temperature of 1580° C., a pressure of 30 atm. and a holding time of 10 to 30 minutes. The resulting ceramic has a composition substantially equal to the blending composition of the powders, and the metal oxide forms the binder phase thereof while $Al_2O_3$ and M(CNO) define the hard dispersed phase.

The aforesaid $Al_2O_3$ ceramic is, however, insufficient for use in cutting tools. More specifically, as the demands for labor saving, higher performance and higher speed operation increase in various industrial fields, the conditions under which the cutting tools are put to use are also becoming severe. Thus, cutting tools are now required to have greater strength and toughness. However, the aforesaid $Al_2O_3$ ceramic, as well as the other kinds of ceramics, are susceptible to fracture or chipping due to insufficient strength and toughness when used under severe conditions.

SUMMARY OF THE INVENTION

It is therefore an object of the present invention to provide an $Al_2O_3$ ceramic which exhibits excellent strength and toughness, so that it is specifically suitable for use in cutting tools for use under severe cutting conditions.

According to the present invention, there is provided an $Al_2O_3$ based ceramic essentially consisting of:

5% to 50% by weight of a hard dispersed phase composed of at least one compound which is selected from the group consisting of metal carbide, metal nitride, metal carbo-nitride, metal oxy-carbide, metal oxy-nitride and metal carbo-oxy-nitride, and is represented by M(CNO), wherein M is at least one metal selected from the group consisting of Ti, Zr and Hf;

optionally 1% to 25% by weight of $ZrO_2$; and balance $Al_2O_3$ matrix containing an additive dissolved in the $Al_2O_3$ grains so as to form solid solution therewith, the additive being contained in an amount of 0.01% to 12% by weight with respect to the $Al_2O_3$ matrix and being composed of at least one oxide of an element selected from the group consisting of Y, Mg, Cr, Ni, Co, and rare earth elements;

the $Al_2O_3$ grains having an average grain size of no larger than 1.0 μm while the hard phase constituent has an average grain size of no larger than 0.6 μm.

DETAILED DESCRIPTION OF THE INVENTION

After an extensive study over the improvement of the conventional $Al_2O_3$ based ceramic, the inventors have successfully obtained a novel $Al_2O_3$ based ceramic which has excellent strength and toughness. More specifically, the inventors prepared $Al_2O_3$ powder of an average particle size of no greater than 0.6 μm, metal oxide powders (additives) of an average particle size of no greater than 1 μm, and powders of hard dispersed phase constituents having an average particle size of no greater than 0.5 μm. The hard phase constituents were one or more compounds selected from the group consisting of metal carbide, metal nitride, metal carbo-nitride, metal oxy-carbide, metal oxy-nitride, metal carbo-oxy-nitride and their solid solutions, and represented by M(CNO), wherein M is a metal selected from the metals of the Group IVa of the Periodic Table, i.e., Ti, Zr and Hf. The metal oxides were those of a metal selected from the group consisting of Y, Mg, Cr, Ni, Co and rare earth elements (R). These starting powders were blended and mixed into the following composition:

Metal oxide powder: 0.01% to 10% by weight with respect to $Al_2O_3$ powder

M(CNO) powder: 5% to 50% by weight with respect to the total amount $Al_2O_3$ powder: remainder Then, the mixture was compacted into a green compact under the conventional conditions, and was sintered by holding it at a temperature of 1,680° C. to 1,830° C. in an argon atmosphere or an atmosphere of a mixture of argon and inert gasses at 0.8 to 5 atm for 10 to 40 minutes. With this high-temperature, brief sintering, it was confirmed that in the resulting $Al_2O_3$ ceramic, the metal oxide was substantially dissolved in the $Al_2O_3$ matrix to form solid solution therewith, and M(CNO) was dispersed in the matrix.

The $Al_2O_3$ ceramic thus obtained was further heat-treated at a temperature of 1,300° C. to 1,450° C. for 2 to 10 hours by holding it in an argon atmosphere or an atmosphere of a mixture of argon and inert gasses at 100 to 2,000 atm. This heat treatment may be carried out following the sintering operation, or separately from the sintering. With this heat treatment, there was obtained a sintered ceramic with a very fine structure where the average grain size of $Al_2O_3$ was no greater than 1 μm while that of M(CNO) was no greater than 0.6 μm, and the resulting ceramic exhibited great strength and toughness as compared with those of the prior art.

Thus, the $Al_2O_3$ based ceramic in accordance with the present invention is characterized in that it essentially consists of 5% to 50% by weight of a hard phase constituent of at least one compound represented by M(CNO), wherein M is at least one metal of Ti, Zr and Hf; and balance $Al_2O_3$ matrix containing an additive dissolved in the $Al_2O_3$ grains so as to form solid solution therewith, the additive being contained in an amount of 0.01% to 10% by weight with respect to the $Al_2O_3$ matrix and being composed of at least one oxide of Y, Mg, Cr, Ni, Co or rare earth elements. In addition, the $Al_2O_3$ grains have an average grain size of no greater than 1.0 μm while the hard phase constituent has an average grain size of no greater than 0.6 μm.

The $Al_2O_3$ ceramic in accordance with the invention has a very fine structure where the $Al_2O_3$ grains and M(CNO) grains are both very fine. In addition, the metal oxides are dissolved in the $Al_2O_3$ grains so as to form solid solution therewith. Therefore, the ceramic of the invention exhibits superior strength and toughness, so that it can be suitably used in cutting tools which are used under severe circumstances.

In addition, when the M(CNO) of the hard dispersed phase is especially metal carbo-nitride or metal carbo-oxy-nitride represented by $M(C_xN_yO_z)$, wherein $0.95 \leq x+y+z \leq 1$, $5/95 \leq x/y \leq 70/30$ and $0 \leq z \leq 0.1$, the sintered material possesses particularly fine structure and exhibits further enhanced strength and toughness.

With respect to the atomic ratios x, y and z in the $M(C_xN_yO_z)$, if the ratios fall out of the range as specified above, the desired characteristics cannot be obtained. More specifically, if a hard phase constituent powder having the ratio x/y exceeding 70/30 is used, sintering operation becomes difficult, so that the sintering must be carried out at a higher temperature in order to ensure a sufficient degree of sintering. However, when the sintering temperature is elevated, the $Al_2O_3$ grains grow excessively to the size of about 3 to 5 μm. On the other hand, if the powder to be used has the ratio x/y of less than 5/95, $M(C_xN_yO_z)$ itself is subjected to an excessive grain growth, so that the hardness of the hard dispersed phase is unduly reduced, resulting in the ceramic of low strength. In addition, the atomic ratio z of oxygen in the $M(C_xN_yO_z)$ is determined so as to satisfy the relationship of $0 \leq z \leq 0.1$. However, if the ratio exceeds 0.1, the grain growth of $M(C_xN_yO_z)$ becomes excessive although the higher degree of sintering is attained. Therefore, the atomic ratio z is preferably determined so as to be no greater than 0.1.

Furthermore, in the $Al_2O_3$ ceramic of the invention, the M(CNO) grains may exist not only at the grain boundaries of $Al_2O_3$ grains but also within $Al_2O_3$ grains, and the M(CNO) grains existing in the $Al_2O_3$ grains substantially enhance strength and toughness of the ceramic. In this regard, it is preferable that the M(CNO) grains exist within the $Al_2O_3$ grains at least in an amount of 10% by weight with respect to the hard dispersed phase, and those within the $Al_2O_3$ grains has an average grain size of no greater than 0.3 μm.

In addition, in the above $Al_2O_3$ ceramic, due to the above specific structure, a great residual compressive stress is exerted on the $Al_2O_3$ grains. Thus, it is preferable that a residual compressive stress of no less than 20 MPa be exerted on the $Al_2O_3$ grains.

The reasons for the numerical restrictions in the resulting ceramic will now be described in conjunction with the procedures.

(a) $Al_2O_3$

If the average grain size of $Al_2O_3$ exceeds 1 μm, the $Al_2O_3$ grains abruptly grow in such a manner as to take in the M(CNO), so that their average grain size becomes unduly large, resulting in a lowering of the strength of the ceramic. Therefore, the average grain size of $Al_2O_3$ is determined so as to be no greater than 1 μm.

In this regard, in order to ensure the formation of $Al_2O_3$ grains of the above grain size, the average particle size of the $Al_2O_3$ powder should be no greater than 0.6 μm.

Furthermore, although not restricted in the above, it is preferable that the content of $Al_2O_3$ in the ceramic be set to no less than 50% by weight in order to obtain a ceramic having sufficient heat resistance.

(b) M(CNO)

M(CNO) is caused to be dispersed at the grain boundaries of $Al_2O_3$ to enhance the wear resistance of ceramic, and is partly caused to be dissolved in the $Al_2O_3$ grains to improve the strength and toughness of the ceramic.

If the M(CNO) content is less than 5% by weight, the above advantages cannot be obtained. On the other hand, if its content in the ceramic exceeds 50% by weight, the degree of sintering is reduced, so that the strength of the ceramic is unduly lowered. Therefore, the M(CNO) content in the ceramic is determined so as to range from 5% to 50% by weight. In order to ensure this range, the blending composition of the M(CNO) powder is also set to the range of between 5% and 50% by weight.

Furthermore, if the average grain size of M(CNO) exceeds 0.6 μm, the interface at which the adjacent M(CNO) grains contact each other is increased. As a result, the resulting hard dispersed phase comes to have grains of greater sizes than expected, so that the strength and toughness of the ceramic is reduced. Accordingly, the average grain size of the hard phase constituent is determined to be no greater than 0.6 μm. In this regard, in order to ensure the above grain size of M(CNO) grains, it is preferable that the average particle size of the M(CNO) powder be no greater than 1.0 μm. Furthermore, in the case where the M(CNO) of the hard dispersed phase is carbo-nitride or carbo-oxy-nitride represented by $M(C_xN_yO_z)$, wherein $0.95 \leq x+y+z \leq 1$, $5/95 \leq x/y \leq 70/30$ and $0 \leq z \leq 0.1$, degree of sintering is further improved, and grain growth during the sintering is less, so that the above fine structure may be obtained more easily.

Moreover, as described above, it is preferable that the M(CNO) grains exist within the $Al_2O_3$ grains at least in an amount of 10% by weight with respect to the hard dispersed phase, and those within the $Al_2O_3$ grains have an average grain size of no greater than 0.3 μm. In order to produce the ceramic of this structure, the M(CNO) powder including at least 10% of fine powder of an particle size no greater than 0.3 μm should be used. This fine powder may be prepared by introducing M(CNO) powder of an average particle size of 0.7 to 2 μm in an attrition mill together with WC-based cemented carbide balls of 1 to 3 mm in diameter, and carrying out crushing for 10 to 100 hours.

(c) Metal oxides

The metal oxides are dissolved in the $Al_2O_3$ to form solid solution therewith during the sintering operation to enhance the degree of sintering, so that the strength of the resulting ceramic is increased. In addition, the metal oxides facilitate the $Al_2O_3$ grains to grow so as to take in fine M(CNO) grains of no greater than 0.3 μm. However, if the content is set to less than 0.01% by weight with respect to $Al_2O_3$, the above effects cannot be obtained. On the other hand, if the content exceeds 10% by weight, it remains at the grain boundaries of the $Al_2O_3$ grains, so that the hardness and strength at high temperature are particularly reduced. In this regard, the blending composition of the metal oxide powders should be also determined equal to the above range.

Furthermore, in order to cause the grains to be dissolved in the $Al_2O_3$ more easily, it is preferable that the particle size of the metal oxide powder to be blended be no greater than 1 $\mu$m.

(d) Internal stress.

In some examples of the ceramic of the invention, it has been confirmed that the residual stress exerted on the $Al_2O_3$ grains is comparatively great. This is due to the difference in expansion coefficients between the M(CNO) and the $Al_2O_3$ matrix. For example, if only TiC is added, which has an expansion coefficient less than the $Al_2O_3$, a comparatively small stress is exerted on the $Al_2O_3$ in the resulting sintered material. However, when $M(C_xN_yO_z)$, wherein $0.95 \leq x+y+z \leq 1$, $5/95 \leq x/y \leq 70/30$ and $0 \leq z \leq 0.1$, is added, the residual compressive stress exerted on the $Al_2O_3$ grains becomes great. In view of the properties of the ceramic, it is preferable that a residual compressive stress exerted on the $Al_2O_3$ grains exceeds 20 MPa.

Next, the restrictions on the conditions for the manufacturing process will be explained.

In the procedures, the sintering is carried out by holding the mixture in an argon atmosphere or an atmosphere of a mixture of argon and inert gasses at 0.8 to 5 atm at a temperature of 1,680° C. to 1,830° C. for 10 to 40 minutes. With this high-temperature, brief sintering, the metal oxides are dissolved in the $Al_2O_3$ matrix to form solid solution therewith. However, if the pressure, temperature and holding time are less than 0.8 atm, 1,680° C., and 10 minutes, respectively, sufficient sintering cannot be carried out, so that the metal oxides do not sufficiently dissolve in the $Al_2O_3$ matrix. On the other hand, if the pressure exceeds 5 atm, gas generated during the sintering operation remains in the ceramic, so that fine sintered material cannot be obtained. In addition, if the temperature exceeds 1,830° C., the material powders are subjected to decomposition, so that the sintering is further adversely affected due to the gas produced by this decomposition. Furthermore, if the holding time exceeds 40 minutes, minute grains of no more than 0.3 $\mu$m among the M(CNO) grains are subjected to grain growth, so that the movement of the M(CNO) grains into the $Al_2O_3$ matrix at the subsequent step is insufficient.

Furthermore, in the procedures, the sintered $Al_2O_3$ ceramic is further heat-treated at a temperature of 1,300° C. to 1,450° C. for 2 to 10 hours by holding it in an argon atmosphere or an atmosphere of a mixture of argon and inert gasses at 100 to 2,000 atm. With this heat treatment, the pores in the structure are reduced to obtain a ceramic of generally true density, and the grain growth of the $Al_2O_3$ grains is promoted. In addition, among the M(CNO) existing at the grain boundaries of $Al_2O_3$ grains, those which have an average grain size of no greater than 0.3 $\mu$m are taken in the $Al_2O_3$ matrix. Therefore, the strength and toughness of the resulting ceramic are improved. However, if the pressure in the atmosphere is less than 100 atm, the removal of the pores is insufficient. If the temperature is less than 1,300° C., the grain growth of the $Al_2O_3$ is extremely slow. In addition, if the holding time is shorter than 2 hours, the amount of the M(CNO) taken in the $Al_2O_3$ grains is insufficient. On the other hand, even if the pressure is set to above 2,000 atm, no further advantages can be obtained. In the temperature exceeds 1,450° C., the grain growth of M(CNO) occurs as the $Al_2O_3$ grains grow, so that the content of M(CNO) dispersed in the $Al_2O_3$ becomes unduly reduced. Furthermore, even if the holding time is increased above 10 hours, it results only in increased manufacturing costs.

In the $Al_2O_3$ based ceramic as described above, the metal oxides are dissolved in the $Al_2O_3$. However, some of them may remain at the grain boundaries of $Al_2O_3$ in the form of compounds with $Al_2O_3$. This compounds serve to further enhance the strength and toughness of the ceramic.

More specifically, $Al_2O_3$ powder, metal oxide powders, and powders of hard dispersed phase constituents were blended and mixed in the following composition:

Metal oxide powder: 1% to 12% by weight with respect to $Al_2O_3$ power

M(CNO) powder: 5% to 50% by weight with respect to the total $Al_2O_3$ powder: remainder Then, the mixture was compacted and sintered in the same conditions as previously described, and further subjected to the heat treatment under the same conditions. With these procedures, the ceramic in which the compounds of $Al_2O_3$ and the metal oxides (excluding $Cr_2O_3$) are formed and remain at the grain boundaries of $Al_2O_3$ grains is formed. The M(CNO) is dispersed both at the grain boundaries of $Al_2O_3$ grains and within the grains at a specific ratio as described previously.

In the modified ceramic as described above, it is preferable that the content of the compounds of $Al_2O_3$ and metal oxides range from 0.5% to 10% by weight. If the content is less than 0.5% by weight, the aforesaid effects cannot be obtained. On the other hand, if the content exceeds 10% by weight, the hardness and wear resistance are reduced.

Furthermore, the $Al_2O_3$ based ceramic of the invention may be further modified using zirconium oxide ($ZrO_2$). More particularly, $ZrO_2$ powder having an average particle size of 0.5 $\mu$m is prepared, and blended with the other powders in the following composition:

Metal oxide powder: 0.01% to 10% by weight with respect to $Al_2O_3$ power $ZrO_2$: 1% to 25% by weight with respect to the total amount M(CNO) powder: 5% to 45% by weight with respect to the total amount $Al_2O_3$ powder: remainder Then, the mixture was compacted into a green compact under the conventional conditions, and was sintered by holding it in a non-oxidizing atmosphere at a temperature of 1,600° C. to 1,800° C. for a prescribed period of time, and the sintered material was further heat-treated at a temperature of 1,400° C. to 1,800° C. for a prescribed period of time by holding it in an inert atmosphere at 500 to 2000 atm.

The $Al_2O_3$ based ceramic thus produced essentially consists of a matrix of $Al_2O_3$ in which one or more of the metal oxides are dissolved so as to form solid solution therewith; M(CNO) in an amount of 5% to 45% by weight (with respect to the $Al_2O_3$ matrix), and $ZrO_2$ in an amount of 1% to 25% by weight in which one or more of the metal oxides are dissolved so as to form solid solution therewith. In addition, the $ZrO_2$ dissolved in the $Al_2O_3$ grains has an average grain size of no greater than 0.2 $\mu$m, while the M(CNO) has an average grain size of no greater than 0.3 $\mu$m.

In the foregoing, $ZrO_2$ partly exists at the grain boundaries of $Al_2O_3$ grains, and these grains are subjected to phase transformation from a tetragonal system to a monoclinic system to thereby impart residual compressive stress to the surface of the ceramic. Therefore, the ceramic is less susceptible to fracture or chipping when used as cutting tools. In addition, ZrO₂ is partly dissolved in the Al₂O₃ grains during the heat treatment to thereby impart a desired residual stress to the Al₂O₃ grains. However, if ZrO₂ content in the ceramic is less than 1% by weight, desired effect cannot be obtained. On the other hand, if the content exceeds 25% by weight, the resistance to thermal shock is deteriorated. Therefore, the ZrO₂ content in the ceramic is determined so as to range from 1% to 25% by weight. In this respect, the blending composition for the ZrO₂ powder should also be determined so as to range from 1% to 25% by weight.

Moreover, as a further modified ceramic in accordance with the present invention, there is provided a ceramic with a hard coating. The hard coating may be effected by introducing the ceramic substrate obtained as described above into a physical vapor deposition apparatus of the activation reaction type using an electron beam, as disclosed in Japanese patent Application laid open with Publication No. 63-26356. The coating operation is carried out by controlling the deposition rate so as to be slow. The rate of the conventional depositing process is usually 2 $\mu$m (in thickness) per hour, but in the invention, the vapor deposition is carried out, for example, at a rate of 0.1 to 0.6 $\mu$m per hour. One or more layers of at least one composition, selected from the group consisting of carbide, nitride and carbonitride of titanium and Al₂O₃, are formed on the substrate under these conditions. The hard coating thus formed is very fine, and when the average grain size is reduced to no larger than 300 Angstroms, the bonding strength of the hard coating with respect to the substrate is greatly increased. Therefore, the resulting ceramic is less susceptible to fracture or chipping even when used under severe conditions, and exhibits superior antifracture characteristics over a long period of time.

Furthermore, the most preferable ceramic substrate to be coated is the one that has the following composition:

TiCN: 20% to 50% by weight
Metal oxide: 0.01% to 10% by weight with respect to Al₂O₃
Al₂O₃: remainder The average thickness of the hard coating should range from 0.3 to 20 $\mu$m in order to ensure adequate properties, while the average grain size of the coating should range from 150 to 300 Angstroms.

In the foregoing, TiCN serves to enhance the thermal shock resistance and to enhance the bonding strength between the substrate and the hard coating. However, if TiCN content is less than 20% by weight, the above advantages cannot be obtained. Therefore, the TiCN content is determined so as to range from 20 to 50% by weight. In addition, it is further preferable that TiCN have atomic ratios satisfying $5/95 \leq C/N \leq 70/30$.

In addition, the average grain size of the coating should range from 150 to 300 Angstroms. If it exceeds 300 Angstroms, antifracture characteristics are sharply reduced, so that the ceramic is susceptible to fracture or chipping under severe cutting conditions. Therefore, the finer the grains, the better the antifracture characteristics. However, if the average grain size is less than 150 Angstroms, the rate of formation of the coating layers is sharply reduced, resulting in high in cost. Therefore, the average grain size has been determined as specified above.

Furthermore, the average thickness of the hard coating should range from 0.3 to 20 $\mu$m. If the thickness is less than 0.3 $\mu$m, sufficient wear resistance cannot be obtained. On the other hand, if the thickness exceeds 20 $\mu$m, the thermal shock resistance is reduced unduly.

The vapor deposition process to be used may be either physical vapor deposition or chemical vapor deposition, although the deposition rate has to be controlled as described above.

As described above, the Al₂O₃ based ceramic in accordance with the present invention has great strength and toughness. Accordingly, when employed in cutting tools for use under conditions where the above characteristics are required, the ceramics of the invention exhibit excellent performance for an extremely long period of time. Therefore, although high-speed operation demands are increasing in the field of cutting tools, the cutting tools of the ceramics of the invention can successfully meet these demands.

The present invention will now be described in more detail by way of the following examples.

EXAMPLE 1

There were prepared starting powders of Al₂O₃, M(CNO) and metal oxides, each having a prescribed average particle size as shown in Tables 1-1a and 1-2a. These powders were blended in various blending compositions as set forth in Tables 1-1a and 1-2a, and were subjected to wet mixing in a ball mill for a period of 72 hours. After being dried, the mixtures were pressed under a pressure of 1 ton/cm² into green compacts having a size of 30 mm × 30 mm × 10 mm, and into green compacts having a shape of a cutting insert in conformity with SNGN120408 of the ISO standards. Subsequently, these green compacts were subjected to high-temperature, short-time sintering and the heat treatments under the conditions as set forth in Tables 1-1b and 1-2b, to produce ceramics 1 to 15 of the invention.

Furthermore, for comparison purposes, green compacts having the compositions as set forth in Table 1-2a were prepared using powders shown in Table 1-2a, and were subjected to hot pressing under the conditions of Table 1-2b instead of being subjected to the high-temperature short-time sintering and heat treatments. Thus, comparative ceramics 1 to 5 were manufactured.

As to the various ceramics thus obtained, their compositions, theoretical density ratios, Rockwell hardnesses (A scale) and transverse rupture strengths were measured. In addition, fracture toughnesses were also measured by the indentation method.

Subsequently, the ceramics thus obtained were subjected to wet-type interrupted cutting tests of hardened steel under the following conditions:

Workpiece: hollow square bar of hardened steel (JIS.SUJ2; Hardness: H$_R$C61)
Cutting speed: 200 meters/minute
Depth of cut: 0.3 mm
Feed rate: 0.2 mm/revolution In this test, the time required until the cutting edge was subjected to chipping was measured. The results are set forth in Table 2.

As will be clearly seen from Table 2, the ceramics 1 to 15 of the invention had theoretical density ratios of no less than 99% and had less micropore formation, so that the ceramics are very fine. Therefore, as compared with the comparative ceramics 1 to 5, the ceramics 1 to 15 of the invention exhibited excellent strength and toughness, and high strength as well.

EXAMPLE 2

There were prepared starting powders of $Al_2O_3$, M(CNO) and metal oxides, each having a prescribed average particle size as shown in Tables 3-1a and 3-2a. These powders were blended in various blending compositions as set forth in Tables 3-1a and 3-2a, and were subjected to wet mixing in a ball mill for a period of 72 hours. After being dried, the mixtures were pressed under a pressure of 1 ton/cm$^2$ into green compacts having a size of 30 mm×30 mm×10 mm, and green compacts having a diameter of 120 mm and a width of 60 mm. Subsequently, these green compacts were subjected to high-temperature and short-time sintering and the heat treatments under the conditions as set forth in Tables 3-1b and 3-2b, to produce ceramics 16 to 30 of the invention.

Furthermore, for comparison purposes, green compacts having the compositions as set forth in Table 3-2a were prepared using powders shown in Table 3-2a, and were subjected to hot pressing under the conditions of Table 3-2b instead of being subjected to the high-temperature and short-time sintering and heat treatments. Thus, comparative ceramics 6 to 10 were manufactured.

As to the various ceramics thus obtained, their compositions, theoretical density ratios, Rockwell hardnesses (A scale) and transverse rupture strengths were measured. In addition, fracture toughnesses were also measured by the indentation method.

Furthermore, an L-shaped bore having a length of 30 mm was formed through the disk-shaped ceramics 120 mm in diameter by using an electric discharge machine. Then, using the resulting ceramics as dies, warm extrusion operation of aluminum was carried out under the following conditions:
  Workpiece: pure aluminum (heating temperature: 480° C.)
  Extrusion speed: 20 meters/minute
Measurements were taken of the extrusion time elapsed before the dies cracked and service life was terminated. The results are set forth in Table 4.

As will be clearly seen from the results of Table 4, the ceramics 16 to 30 of the invention had theoretical density ratios of no less than 99% and had less micropore formation, so that they were very fine. As compared with the comparative ceramics 16 to 30, the ceramics 16 to 30 of the invention exhibited excellent strength and toughness, and high strength as well.

EXAMPLE 3

There were prepared starting powders of $Al_2O_3$, M(CNO), $ZrO_2$ and other metal oxides, each having a prescribed average particle size as shown in Table 5-1. These powders were blended in various blending compositions as set forth in Table 5-1, and were subjected to wet mixing in an attrition mill for a period of 30 hours. After being dried, the mixtures were pressed under a pressure of 1 ton/cm$^2$ into green compacts each having a size of 30 mm×30 mm×10 mm, and green compacts each having a shape of a cutting insert, in conformity with SNGN120408 of the ISO standards. Subsequently, these green compacts were subjected to sintering and heat treatments under the conditions as set forth in Table 5-2, to produce ceramics 31 to 40 of the invention.

Furthermore, for comparison purposes, green compacts having the compositions as set forth in Table 5-1 were prepared using powders shown in Table 5-1, and were subjected to hot pressing under the conditions of Table 5-2 instead of being subjected to the sintering and heat treatments. Thus, comparative ceramics of 11 to 15 were manufactured.

As to the various ceramics thus obtained, their compositions, theoretical density ratios, and Rockwell hardnesses (A scale) were measured. In addition, in order to evaluate strength and toughness, bending strength at three-points and fracture toughness using the indentation method were also measured.

Subsequently, the ceramics thus obtained were subjected to dry-type continuous cutting tests of high speed steel under the following conditions:
  Workpiece: high speed steel (SKD-11)
  Cutting speed: 100 meters/minute
  Depth of Cut: 1 mm
  Feed rate: 0.13 mm/revolution
In this test, the length of time it took until the flank wear of the cutting edge reached 0.2 mm wide was measured. The results are set forth in Table 6.

As will be clearly seen from Table 6, the ceramics 31 to 40 of the invention had theoretical density ratios of no less than 99% and had less micropore formation, so that the ceramics of the invention are very fine. In addition, the ceramics have great strength due to the residual stress of the $Al_2O_3$ grains. Furthermore, $ZrO_2$ existing at the grain boundaries of the $Al_2O_3$ grains enhances the toughness, so that the cutting edge is less susceptible to fracture or chipping, resulting in an increased tool life. Therefore, as compared with the comparative ceramics 11 to 13, the ceramics 31 to 40 of the invention exhibit excellent strength and toughness, and high strength as well.

EXAMPLE 4

There were prepared starting powders of TiCN (average particle size: 0.5 μm), $Al_2O_3$ (0.3 μm), MgO (0.3 μm), $Y_2O_3$ (0.6 μm) and $ZrO_2$ (0.3 μm). These powders were blended in various blending compositions as set forth in Tables 7-1a and 7-2a, and were subjected to wet mixing in an attrition mill for a period of 10 hours. After being dried, the mixtures were pressed into green compacts, which were then subjected to high-temperature and short-time sintering and the heat treatments under the conditions similar to those in the previous examples, to produce the ceramic substrates which were of a shape of a cutting insert in conformity with SNGN 120408.

Subsequently, these substrates were introduced into a physical vapor deposition apparatus of the activation reaction type using an electron beam, as disclosed in Japanese Patent Application laid open with Publication No. 63-26356. By controlling the deposition speed, the average grain size of the hard coating were varied, so that the hard coatings having compositions, average grain sizes, and average layer thicknesses, as set forth in Tables 7-1b and 7-2b, were formed.

Thereafter, the ceramics thus obtained (coated ceramics 1 to 10 of the invention and comparative coated ceramics 1 to 10) were subjected to wet-type interrupted cutting tests of hardened steel under the following conditions:
  Workpiece: round bar of SNCM 439
  Cutting speed: 350 meters/minutes
  Feed rate: 0.3 mm/revolution
  Depth of cut: 1.5 mm
  Cutting time: 20 minutes Furthermore, the high-speed dry-type continuous cutting test was carried out under the following conditions:
Workpiece: round bar of SNCM 439 having four axial grooves disposed in longitudinally equally spaced relation to one another
Cutting speed: 250 meters/minute
Feed rate: 0.1 mm/revolution
Depth of cut: 1.0 mm
Cutting time: 15 minutes In these tests, the flank wear and face wear of the cutting edge were measured, and the results are set forth in Table 8.

As will be clearly seen from Table 8, in the coated ceramics 1 to 10 of the invention, the average grain size of the hard coating ranged from 150 to 300 Angstroms. Since the hard coating is thus minute, the ceramics exhibited superior antifracture characteristics even in the severe cutting conditions such as high speed cutting or high feed cutting, and hence exhibits a prolonged tool life. In contrast, the comparative coated ceramics 1 to 10 were subjected to chipping during the cutting operation.

Obviously many modifications and variations of the present invention are possible in the light of the above teachings. It is therefore to be understood that within the scope of the appended claims, the invention may be practiced otherwise than as specifically described.

TABLE 1-1a

| | Blending composition (% by weight) | | | | | | | |
|---|---|---|---|---|---|---|---|---|
| | Metal oxides | | | M (CNO) | | | | $Al_2O_3$ |
| | Average particle size ($\mu$m) | Composition | | Average particle size ($\mu$m) | Percentage of powder no larger than 0.3 $\mu$m | Composition | | Average particle size ($\mu$m) |
| Ceramics of the invention | | | | | | | | |
| 1 | 0.03 | $Y_2O_3$ | 0.3 | 0.8 | 15 | TiC | 30 | 0.3 | remainder |
| 2 | 0.8 | MgO | 1.0 | 1.5 | 10 | TiN | 30 | 0.6 | remainder |
| 3 | 0.5 | $Cr_2O_3$ | 2.0 | 0.5 | 25 | $TiC_{0.5}N_{0.5}$ | 30 | 0.3 | remainder |
| 4 | 1.0 | $Nd_2O_3$ | 0.8 | 0.2 | 80 | $TiC_{0.43}N_{0.5}O_{0.07}$ | 50 | 0.05 | remainder |
| 5 | 0.8 | CoO | 0.3 | 0.5 | 25 | (Ti,Zr)C | 10 | 0.1 | remainder |
| | 0.8 | $Y_2O_3$ | 0.5 | | | | | | |
| 6 | 1.0 | $CeO_2$ | 2.0 | 0.6 | 15 | TiC | 20 | 0.1 | remainder |
| | | | | 0.6 | 15 | $HfC_{0.5}N_{0.5}$ | 20 | | |
| 7 | 0.5 | $La_2O_3$ | 0.1 | 0.1 | 100 | $TiC_{0.9}O_{0.1}$ | 15 | 0.05 | remainder |
| 8 | 0.1 | $Y_2O_3$ | 0.5 | 0.3 | 40 | $(Ti,Hf)C_{0.5}N_{0.5}$ | 20 | 0.3 | remainder |
| | 0.1 | MgO | 1.0 | | | | | | |
| 9 | 0.2 | MgO | 0.5 | 0.5 | 30 | $(Zr,Hf)C_{0.4}N_{0.5}O_{0.1}$ | 25 | 0.3 | remainder |
| | 0.2 | $CeO_2$ | 0.5 | 0.5 | 30 | $TiN_{0.9}O_{0.1}$ | 5 | | |
| 10 | 0.05 | $Dy_2O_3$ | 0.3 | 0.5 | 20 | ZrC | 20 | 0.1 | remainder |

TABLE 1-1b

| | Sintering | | | | Heat treatment | | | |
|---|---|---|---|---|---|---|---|---|
| | Composition of atmosphere (%) | Pressure (Atm) | Temperature (°C.) | Holding time (min) | Composition of atmosphere (%) | Pressure (Atm) | Temperature (°C.) | Holding time (Hr) |
| Ceramics of the invention | | | | | | | | |
| 1 | Ar:100 | 1 | 1730 | 30 | Ar:100 | 1500 | 1400 | 5 |
| 2 | Ar:100 | 1 | 1780 | 30 | Ar:100 | 1500 | 1400 | 5 |
| 3 | Ar:90, $N_2$:10 | 0.9 | 1800 | 30 | Ar:100 | 1500 | 1350 | 5 |
| 4 | Ar:90, $N_2$:10 | 0.9 | 1700 | 30 | Ar:100 | 1500 | 1350 | 5 |
| 5 | Ar:100 | 1 | 1730 | 30 | Ar:100 | 1500 | 1450 | 8 |
| 6 | Ar:100 | 1 | 1730 | 30 | Ar:100 | 1500 | 1400 | 4 |
| 7 | Ar:100 | 0.95 | 1700 | 30 | Ar:100 | 1500 | 1400 | 2 |
| 8 | Ar:90, He:10 | 1 | 1780 | 30 | Ar:90 He:10 | 1000 | 1400 | 4 |
| 9 | Ar:90 He:10 | 1 | 1780 | 30 | Ar:90 He:10 | 1000 | 1450 | 4 |
| 10 | Ar:95, He:5 | 2 | 1800 | 10 | Ar:95 He:5 | 1000 | 1300 | 4 |

TABLE 1-2a

| | Blending composition (% by weight) | | | | | | | |
|---|---|---|---|---|---|---|---|---|
| | Metal oxides | | | M (CNO) | | | | $Al_2O_3$ |
| | Average particle size ($\mu$m) | Composition | | Average particle size ($\mu$m) | Percentage of powder no larger than 0.3 $\mu$m | Composition | | Average particle size ($\mu$m) |
| Ceramics of the invention | | | | | | | | |
| 11 | 0.5 | $Yb_2O_3$ | 0.3 | 0.2 | 70 | $(Zr,Hf)C_{0.4}N_{0.5}O_{0.1}$ | 10 | 0.3 | remainder |
| 12 | 0.4 | NiO | 0.2 | 0.5 | 25 | $ZrC_{0.3}N_{0.7}$ | 40 | 0.3 | remainder |

TABLE 1-2a-continued

| | Blending composition (% by weight) | | | | | | | |
|---|---|---|---|---|---|---|---|---|
| | Metal oxides | | M (CNO) | | | | $Al_2O_3$ | |
| | Average particle size (μm) | Composition | Average particle size (μm) | Percentage of powder no larger than 0.3 μm | Composition | | Average particle size (μm) | |
| 13 | 0.4 | $Yb_2O_3$ | 0.5 | | | | | |
| | 0.5 | $Y_2O_3$ | 0.05 | 0.5 | 5 | $ZrC_{0.5}N_{0.45}O_{0.05}$ | 10 | 0.3 | remainder |
| | 0.5 | $Dy_2O_3$ | 0.05 | | | | | |
| 14 | 0.05 | $Y_2O_3$ | 0.05 | 0.1 | 70 | $HfC_{0.7}N_{0.3}$ | 5 | 0.05 | remainder |
| 15 | 0.1 | $Dy_2O_3$ | 0.5 | 0.3 | 35 | $TiC_{0.1}N_{0.9}$ | 35 | 0.3 | remainder |
| Prior art cermets | | | | | | | | |
| 1 | 0.03 | $Y_2O_3$ | 8 | 0.8 | 3 | TiC | 30 | 1.0 | remainder |
| 2 | 0.8 | MgO | 3 | 1.0 | 1 | TiN | 10 | 1.0 | remainder |
| 3 | 1.0 | NiO | 5 | 0.8 | 3 | $TiC_{0.5}N_{0.45}O_{0.05}$ | 10 | 0.8 | remainder |
| 4 | 0.5 | $Y_2O_3$ | 4 | 1.5 | 1 | $ZrC_{0.5}N_{0.5}$ | 30 | 1.5 | remainder |
| | 0.5 | $Yb_2O_3$ | 4 | | | | | |
| 5 | 0.1 | $Dy_2O_3$ | 5 | 2.0 | 1 | HfC | 30 | 1.5 | remainder |

TABLE 1-2b

| | Sintering or Hot pressing | | | | Heat treatment | | | |
|---|---|---|---|---|---|---|---|---|
| | Composition of atmosphere (%) | Pressure (Atm) | Temperature (°C.) | Holding time (min) | Composition of atmosphere (%) | Pressure (Atm) | Temperature (°C.) | Holding time (Hr) |
| Ceramics of the invention | | | | | | | | |
| 11 | Ar:95 He:5 | 5 | 1700 | 20 | Ar:95, He:5 | 1000 | 1300 | 10 |
| 12 | Ar:100 | 0.95 | 1780 | 40 | Ar:100 | 2000 | 1400 | 5 |
| 13 | Ar:100 | 0.8 | 1680 | 20 | Ar:100 | 2000 | 1350 | 8 |
| 14 | Ar:100 | 0.9 | 1680 | 40 | Ar:100 | 2000 | 1300 | 8 |
| 15 | Ar:100 | 1 | 1780 | 40 | Ar:100 | 2000 | 1450 | 2 |
| Prior art cermets | | | | | | | | |
| 1 | $N_2$ | 100 | 1580 | 30 | — | — | — | — |
| 2 | Vacuum | 0.5 | 1750 | 30 | — | — | — | — |
| 3 | $N_2$ | 100 | 1600 | 30 | — | — | — | — |
| 4 | Ar | 1 | 1600 | 30 | — | — | — | — |
| 5 | Ar | 1 | 1600 | 30 | — | — | — | — |

TABLE 2

| | Composition (% by weight) | | | | | | | | | | | |
|---|---|---|---|---|---|---|---|---|---|---|---|---|
| | M (CNO) | | | | $Al_2O_3$ | | | Theoretical density ratio (%) | Hardness ($H_RA$) | Bending strength (kg/mm²) | Fracture toughness ($MN/m^{3/2}$) | Cutting time until chipping (min) |
| | Average grain size (μm) | Within grains | At grain boundary | Binder phase | $Al_2O_3$ | Average grain size (μm) | Internal stress (MPa) | | | | | |
| Ceramics of the invention | | | | | | | | | | | | |
| 1 | 0.6 | 3 | 27 | — | remainder | 0.8 | 10* | 99.8 | 94.5 | 136 | 5.2 | 4.0 |
| 2 | 0.6 | 2 | 28 | — | remainder | 0.9 | 13 | 99.5 | 94.0 | 122 | 5.0 | 3.0 |
| 3 | 0.5 | 4 | 26 | — | remainder | 0.9 | 90 | 99.8 | 94.3 | 128 | 5.2 | 3.0 |
| 4 | 0.4 | 20 | 30 | — | remainder | 0.6 | 60 | 99.6 | 94.6 | 122 | 6.0 | 4.3 |
| 5 | 0.5 | 2 | 8 | — | remainder | 0.8 | 14 | 99.9 | 93.7 | 130 | 5.0 | 3.0 |
| 6 | 0.6 | 4 | 36 | — | remainder | 0.9 | 8 | 99.8 | 94.4 | 122 | 5.0 | 3.0 |
| 7 | 0.4 | 13 | 2 | — | remainder | 0.5 | 7 | 99.8 | 93.8 | 132 | 5.8 | 3.5 |
| 8 | 0.4 | 6 | 14 | — | remainder | 0.6 | 120 | 99.9 | 94.0 | 138 | 5.4 | 4.0 |
| 9 | 0.6 | 6 | 24 | — | remainder | 0.8 | 30 | 99.6 | 94.3 | 130 | 5.6 | 3.5 |
| 10 | 0.6 | 3 | 17 | — | remainder | 0.9 | 20* | 99.8 | 94.1 | 136 | 5.2 | 3.5 |
| 11 | 0.4 | 6 | 4 | — | remainder | 0.7 | 110 | 99.8 | 93.8 | 136 | 5.6 | 3.0 |
| 12 | 0.6 | 7 | 33 | — | remainder | 0.8 | 140 | 99.6 | 94.6 | 128 | 5.4 | 3.5 |
| 13 | 0.6 | 0 | 10 | — | remainder | 0.8 | 55 | 99.8 | 93.9 | 136 | 5.2 | 3.0 |
| 14 | 0.3 | 3 | 2 | — | remainder | 0.9 | 70 | 99.9 | 93.7 | 138 | 5.4 | 3.0 |
| 15 | 0.5 | 8 | 27 | — | remainder | 1.0 | 80 | 99.8 | 94.5 | 132 | 5.4 | 3.5 |
| Prior art cermets | | | | | | | | | | | | |
| 1 | 0.9 | — | 30 | 4 | remainder | 3.2 | 6 | 99.7 | 94.2 | 92 | 3.0 | 0.2 |
| 2 | 1.6 | — | 10 | 2 | remainder | 2.8 | 18 | 99.2 | 92.9 | 78 | 3.4 | 0.1 |
| 3 | 0.8 | — | 10 | 3 | remainder | 1.8 | 30 | 99.8 | 93.3 | 84 | 3.2 | 0.1 |
| 4 | 1.5 | — | 30 | 4 | remainder | 3.5 | 25 | 99.8 | 93.5 | 82 | 3.0 | 0.2 |

TABLE 2-continued

| | Composition (% by weight) | | | | | | | | | | |
|---|---|---|---|---|---|---|---|---|---|---|---|
| | M (CNO) | | | | Al$_2$O$_3$ | | | Theoretical density ratio (%) | Hardness (H$_R$A) | Bending strength (kg/mm$^2$) | Fracture toughness (MN/m$^{3/2}$) | Cutting time until chipping (min) |
| | Average grain size (μm) | Within grains | At grain boundary | Binder phase | Al$_2$O$_3$ | Average grain size (μm) | Internal stress (MPa) | | | | | |
| 5 | 1.9 | — | 30 | 2 | remainder | 3.1 | 15* | 99.7 | 93.9 | 78 | 3.0 | 0.2 |

*indicates tensile stress.

TABLE 3-1a

| | Blending composition (% by weight) | | | | | | |
|---|---|---|---|---|---|---|---|
| | Metal oxides | | M (CNO) | | | | Al$_2$O$_3$ |
| | Average particle size (μm) | Composition | Average particle size (μm) | Percentage of powder no larger than 0.3 μm | Composition | | Average particle size (μm) |
| Ceramics of the invention | | | | | | | |
| 16 | 0.03 | Y$_2$O$_3$ | 1 | 0.6 | 15 | TiC | 30 | 0.05 | remainder |
| 17 | 0.5 | Y$_2$O$_3$ | 6 | 0.5 | 25 | TiC$_{0.5}$N$_{0.5}$ | 50 | 0.3 | remainder |
| 18 | 0.2 | MgO | 3 | 0.2 | 80 | TiC$_{0.45}$N$_{0.5}$O$_{0.05}$ | 30 | 0.1 | remainder |
| 19 | 1.5 | MgO | 5 | 0.5 | 20 | ZrC | 20 | 0.6 | remainder |
| 20 | 1.0 | Nd$_2$O$_3$ | 5 | 0.5 | 25 | (Ti,Zr)C | 10 | 0.6 | remainder |
| 21 | 1.0 | CeO$_2$ | 3 | 0.1 | 100 | TiC$_{0.8}$O$_{0.2}$ | 5 | 0.6 | remainder |
| 22 | 0.5 | La$_2$O$_3$ | 3 | 0.3 | 40 | (Zr,Hf)C$_{0.3}$N$_{0.7}$ | 10 | 0.3 | remainder |
| 23 | 0.05 | Dy$_2$O$_3$ | 3 | 0.5 | 20 | (Zr,Hf)C | 30 | 0.1 | remainder |
| 24 | 0.5 | Dy$_2$O$_3$ | 5 | 0.5 | 30 | (Ti,Zr)C$_{0.7}$N$_{0.3}$ | 30 | 0.3 | remainder |
| 25 | 0.5 | Yb$_2$O$_3$ | 5 | 0.4 | 40 | (Ti,Zr)C$_{0.4}$N$_{0.5}$O$_{0.1}$ | 30 | 0.3 | remainder |

TABLE 3-1b

| | Sintering | | | | Heat treatment | | | |
|---|---|---|---|---|---|---|---|---|
| | Composition of atmosphere (%) | Pressure (Atm) | Temperature (°C.) | Holding time (min) | Composition of atmosphere (%) | Pressure (Atm) | Temperature (°C.) | Holding time (Hr) |
| Ceramics of the invention | | | | | | | | |
| 16 | Ar:100 | 1 | 1730 | 30 | Ar:100 | 1500 | 1300 | 5 |
| 17 | Ar:100 | 1 | 1800 | 40 | Ar:100 | 1500 | 1350 | 5 |
| 18 | Ar:100 | 1 | 1730 | 30 | Ar:100 | 1500 | 1350 | 5 |
| 19 | Ar:100 | 0.9 | 1750 | 15 | Ar:100 | 1500 | 1400 | 5 |
| 20 | Ar:100 | 0.9 | 1730 | 15 | Ar:100 | 1000 | 1400 | 8 |
| 21 | Ar:100 | 0.9 | 1700 | 30 | Ar:100 | 1000 | 1400 | 2 |
| 22 | Ar:90, He:10 | 4 | 1750 | 10 | Ar:90, He:10 | 1500 | 1350 | 8 |
| 23 | Ar:90, He:10 | 2 | 1730 | 30 | Ar:90, He:10 | 2000 | 1350 | 8 |
| 24 | Ar:100 | 1 | 1780 | 30 | Ar:100 | 1000 | 1350 | 5 |
| 25 | Ar:100 | 0.9 | 1780 | 30 | Ar:100 | 1000 | 1350 | 5 |

TABLE 3-2a

| | Blending composition (% by weight) | | | | | | |
|---|---|---|---|---|---|---|---|
| | Metal oxides | | M (CNO) | | | | Al$_2$O$_3$ |
| | Average particle size (μm) | Composition | Average particle size (μm) | Percentage of powder no larger than 0.3 μm | Composition | | Average particle size (μm) |
| Ceramics of the invention | | | | | | | |
| 26 | 0.03 | Y$_2$O$_3$ | 3 | 0.4 | 30 | ZrC$_{0.5}$N$_{0.5}$ | 30 | 0.3 | remainder |
| | 1.0 | NiO | 2 | | | | | | |
| 27 | 1.0 | Nd$_2$O$_3$ | 3 | 0.4 | 25 | (Zr,Hf)C$_{0.5}$N$_{0.5}$ | 30 | 0.3 | remainder |
| | 1.0 | CoO | 2 | | | | | | |
| 28 | 0.03 | Y$_2$O$_3$ | 3 | 0.2 | 80 | TiC$_{0.3}$N$_{0.7}$ | 30 | 0.3 | remainder |
| | 0.2 | MgO | 3 | | | | | | |
| 29 | 0.2 | MgO | 3 | 0.5 | 20 | ZrC | 30 | 0.3 | remainder |
| | 1.0 | CeO$_2$ | 5 | | | | | | |
| 30 | 0.05 | Dy$_2$O$_3$ | 3 | 0.1 | 100 | TiC$_{0.9}$O$_{0.1}$ | 30 | 0.3 | remainder |
| | 1.0 | Cr$_2$O$_3$ | 3 | | | | | | |
| Prior art cermets | | | | | | | | |
| 6 | 0.03 | Y$_2$O$_3$ | 15 | 0.8 | 2 | TiC | 30 | 1.0 | remainder |

TABLE 3-2a-continued

| | Blending composition (% by weight) | | | | | | | |
|---|---|---|---|---|---|---|---|---|
| | Metal oxides | | M (CNO) | | | Al$_2$O$_3$ | | |
| | Average particle size (μm) | Composition | Average particle size (μm) | Percentage of powder no larger than 0.3 μm | Composition | | Average particle size (μm) | |
| 7 | 1.5 | MgO | 15 | 1.0 | 1 | TiN | 10 | 1.0 | remainder |
| 8 | 0.5 | La$_2$O$_3$ | 15 | 0.8 | 2 | TiC$_{0.4}$N$_{0.4}$O$_{0.1}$ | 10 | 0.8 | remainder |
| 9 | 0.5 | Y$_2$O$_3$ | 9 | 1.5 | 1 | ZrC$_{0.5}$N$_{0.5}$ | 30 | 1.5 | remainder |
| | 1.5 | NiO | 6 | | | | | | |
| 10 | 0.1 | Dy$_2$O$_3$ | 8 | 2.0 | 1 | HfC | 30 | 1.5 | remainder |
| | 1.5 | Cr$_2$O$_3$ | 7 | | | | | | |

TABLE 3-2b

| | Sintering or Hot pressing | | | | Heat treatment | | | |
|---|---|---|---|---|---|---|---|---|
| | Composition of atmosphere (%) | Pressure (Atm) | Temperature (°C.) | Holding time (min) | Composition of atmosphere (%) | Pressure (Atm) | Temperature (°C.) | Holding time (Hr) |
| Ceramics of the invention | | | | | | | | |
| 26 | Ar:100 | 1 | 1730 | 20 | Ar:100 | 1500 | 1350 | 8 |
| 27 | Ar:100 | 1 | 1780 | 30 | Ar:100 | 1500 | 1350 | 8 |
| 28 | Ar:100 | 1 | 1730 | 20 | Ar:100 | 1500 | 1300 | 5 |
| 29 | Ar:100 | 1 | 1780 | 30 | Ar:100 | 1500 | 1350 | 8 |
| 30 | Ar:100 | 1 | 1750 | 20 | Ar:100 | 1500 | 1300 | 8 |
| Prior art cermets | | | | | | | | |
| 6 | N$_2$ | 100 Torr | 1580 | 30 | — | — | — | — |
| 7 | Vacuum | 0.5 Torr | 1750 | 30 | — | — | — | — |
| 8 | N$_2$ | 100 Torr | 1600 | 30 | — | — | — | — |
| 9 | Ar | 1 | 1600 | 30 | — | — | — | — |
| 10 | Ar | 1 | 1600 | 30 | — | — | — | — |

TABLE 4

| | Composition (% by weight) | | | | | | Theoretical density ratio (%) | Hardness (H$_R$A) | Bending strength (kg/mm$^2$) | Fracture toughness (MN/m$^{3/2}$) | Cutting time until chipping (min) |
|---|---|---|---|---|---|---|---|---|---|---|---|
| | M (CNO) | | | | Al$_2$O$_3$ | | | | | | |
| | Average grain size (μm) | Within grains | At grain boundary | Compounds | Al$_2$O$_3$ | Average grain size (μm) | Internal stress (MPa) | | | | |
| Ceramics of the invention | | | | | | | | | | | | |
| 16 | 0.6 | 26.0 | 4.0 | 0.5 | remainder | 0.8 | 3 | 99.8 | 93.9 | 145 | 6.2 | 16 |
| 17 | 0.6 | 39.8 | 10.2 | 10 | remainder | 0.9 | 96 | 99.9 | 93.6 | 142 | 6.0 | 8 |
| 18 | 0.4 | 8.5 | 21.5 | 3.5 | remainder | 0.7 | 54 | 99.7 | 93.7 | 146 | 6.4 | 16 |
| 19 | 0.6 | 17.0 | 3.0 | 8 | remainder | 0.9 | 1 | 99.6 | 93.4 | 144 | 6.4 | 16 |
| 20 | 0.6 | 9.8 | 0.2 | 5 | remainder | 0.8 | 13* | 99.8 | 93.7 | 140 | 6.2 | 8 |
| 21 | 0.4 | 2.0 | 3.0 | 0.5 | remainder | 0.9 | 4 | 99.8 | 93.9 | 142 | 6.2 | 12 |
| 22 | 0.4 | 6.5 | 3.5 | 2 | remainder | 0.6 | 130 | 99.9 | 93.6 | 142 | 6.0 | 8 |
| 23 | 0.6 | 25.5 | 4.5 | 1.5 | remainder | 0.6 | 17 | 99.9 | 94.0 | 140 | 6.2 | 12 |
| 24 | 0.6 | 22.6 | 7.6 | 4 | remainder | 0.7 | 108 | 99.8 | 93.6 | 143 | 6.0 | 12 |
| 25 | 0.6 | 20.2 | 9.8 | 5 | remainder | 0.8 | 75 | 99.8 | 93.5 | 144 | 6.2 | 12 |
| 26 | 0.5 | 23.6 | 6.4 | 4 | remainder | 0.7 | 47 | 99.7 | 93.7 | 142 | 6.2 | 8 |
| 27 | 0.5 | 24.3 | 5.7 | 6 | remainder | 0.7 | 67 | 99.7 | 93.4 | 142 | 6.0 | 8 |
| 28 | 0.3 | 10.5 | 19.5 | 5 | remainder | 0.5 | 170 | 99.7 | 93.6 | 146 | 6.4 | 16 |
| 29 | 0.6 | 26.4 | 3.6 | 7 | remainder | 0.8 | 8 | 99.8 | 93.4 | 140 | 5.4 | 8 |
| 30 | 0.4 | 5.5 | 24.5 | 1 | remainder | 0.9 | 25 | 99.9 | 93.8 | 146 | 6.2 | 16 |
| Prior art cermets | | | | | | | | | | | | |
| 6 | 1.1 | — | 30 | 6** | remainder | 2.1 | 21* | 99.8 | 93.2 | 82 | 3.2 | 2 |
| 7 | 1.6 | — | 10 | 8** | remainder | 2.5 | 7 | 99.7 | 93.1 | 78 | 3.0 | 2 |
| 8 | 1.3 | — | 10 | 6** | remainder | 1.7 | 40 | 99.7 | 93.2 | 84 | 3.4 | 4 |
| 9 | 1.8 | — | 30 | 5** | remainder | 2.7 | 35 | 99.8 | 93.2 | 70 | 3.0 | 2 |
| 10 | 2.5 | — | 30 | 8** | remainder | 2.4 | 16* | 99.8 | 93.4 | 72 | 3.0 | 2 |

*indicates tensile stress.
**indicates binder phase.

TABLE 5-1

| | Blending composition (% by weight) | | | | | | | | | | |
|---|---|---|---|---|---|---|---|---|---|---|---|
| | M (CNO) | | | $ZrO_2$ | | | Metal oxides | | | $Al_2O_3$ | |
| | Average particle size (μm) | Percentage of fine powder (wt %) | Composition | | Average particle size (μm) | Percentage of fine powder (wt %) | | Average particle size (μm) | Composition | Average particle size (μm) | |
| Ceramics of the invention | | | | | | | | | | | |
| 31 | 0.5 | 15 | $TiC_{0.7}N_{0.3}$ | 5 | 0.4 | 30 | 10 | 0.5 | $Y_2O_3$ | 0.4 | 0.6 | remainder |
| 32 | 0.6 | 12 | $TiC_{0.5}N_{0.5}$ | 30 | 0.3 | 40 | 10 | 0.6 | $Dy_2O_3$ | 0.4 | 0.4 | remainder |
| 33 | 0.4 | 20 | $TiC_{0.3}N_{0.7}$ | 45 | 0.5 | 20 | 1 | 0.6 | $Sm_2O_3$ | 0.4 | 0.6 | remainder |
| 34 | 0.5 | 15 | $ZrC_{0.5}N_{0.5}$ | 20 | 0.3 | 30 | 25 | 0.4 | $Yb_2O_3$ | 0.5 | 0.3 | remainder |
| 35 | 0.3 | 20 | TiN | 30 | 0.4 | 30 | 10 | 0.4 | $Y_2O_3$ | 0.3 | 0.4 | remainder |
| 36 | 0.5 | 20 | $TiC_{0.5}N_{0.4}O_{0.1}$ | 30 | 0.4 | 30 | 10 | 0.4 | $Y_2O_3$ | 0.3 | 0.3 | remainder |
| 37 | 0.3 | 20 | TiC | 30 | 0.4 | 30 | 10 | 0.1 | MgO | 0.5 | 0.4 | remainder |
| 38 | 0.5 | 20 | $ZrC_{0.7}N_{0.2}O_{0.1}$ | 25 | 0.4 | 30 | 10 | 0.1 | CaO | 0.5 | 0.3 | remainder |
|  | 0.5 | 20 | $HfC_{0.7}N_{0.2}O_{0.1}$ | 5 | | | | | | | |
| 39 | 0.5 | 20 | $TiC_{0.7}N_{0.3}$ | 15 | 0.4 | 30 | 10 | 0.4 | $Y_2O_3$ | 0.5 | 0.4 | remainder |
|  | 0.5 | 10 | $ZrC_{0.5}N_{0.5}$ | 15 | | | | | | | |
| 40 | 0.5 | 20 | HfC | 30 | 0.4 | 30 | 10 | 0.1 | MgO | 0.2 | 0.4 | remainder |
|  | | | | | | | | 0.4 | $Y_2O_3$ | 0.3 | | |
| Prior art cermets | | | | | | | | | | | |
| 11 | 1.2 | 3 | TiN | 30 | — | — | — | 0.4 | $Y_2O_3$ | 3 | 0.4 | remainder |
| 12 | 1.5 | 2 | $TiC_{0.5}N_{0.5}$ | 30 | — | — | — | 0.1 | MgO | 3 | 0.4 | remainder |
| 13 | 1.5 | 2 | $TiC_{0.5}N_{0.4}O_{0.1}$ | 30 | — | — | — | 0.3 | CaO | 3 | 0.4 | remainder |

TABLE 5-2

| | Conditions of sintering or hot pressing | | | | Conditions of heat treatment | | | |
|---|---|---|---|---|---|---|---|---|
| | Composition of atmosphere (vol %) | Pressure (Atm) | Temperature (°C.) | Holding time (Hr) | Composition of atmosphere (vol %) | Pressure (Atm) | Temperature (°C.) | Holding time (Hr) |
| Ceramics of the invention | | | | | | | | |
| 31 | Ar:100 | 0.5 | 1600 | 3 | Ar:100 | 500 | 1400 | 10 |
| 32 | Ar:100 | 1 | 1700 | 3 | Ar:100 | 1000 | 1600 | 5 |
| 33 | Ar:100 | 1 | 1800 | 3 | Ar:100 | 1500 | 1800 | 3 |
| 34 | Ar:90, He:10 | 1 | 1700 | 5 | Ar:100 | 1000 | 1500 | 3 |
| 35 | $N_2$:100 | 1 | 1750 | 2 | Ar:100 | 2000 | 1600 | 3 |
| 36 | Ar:100 | 2 | 1750 | 3 | Ar:100 | 1000 | 1600 | 5 |
| 37 | Ar:100 | 1 | 1750 | 3 | Ar:100 | 1000 | 1800 | 3 |
| 38 | Ar:100 | 0.8 | 1750 | 2 | Ar:100 | 1500 | 1700 | 3 |
| 39 | Ar:100 | 1 | 1750 | 3 | Ar:100 | 1000 | 1600 | 3 |
| 40 | Ar:100 | 1 | 1750 | 3 | Ar:100 | 2000 | 1600 | 3 |
| Prior art cermets | | | | | | | | |
| 11 | Ar:100 | 1 | 1700 | 3 | — | — | — | — |
| 12 | Ar:100 | 1 | 1750 | 3 | — | — | — | — |
| 13 | Ar:100 | 1 | 1750 | 3 | — | — | — | — |

TABLE 6

| | Composition (% by weight) | | | | | | | | | | | | | |
|---|---|---|---|---|---|---|---|---|---|---|---|---|---|---|
| | M (CNO) | | | $ZrO_2$ | | | Metal oxides at grain boundary | $Al_2O_3$ | | | | | | |
| | Average grain size | Within grains (μm) | At grain boundary | Within grains | At grain boundary | | $Al_2O_3$ | Average grain size (μm) | Internal stress (MPa) | Theoretical density ratio (%) | Hardness ($H_RA$) | Bending strength (kg/mm²) | FT | Cutting time (min) |
| Ceramics of the invention | | | | | | | | | | | | | | |
| 31 | 0.6 | 0.5 | 4.5 | 2 | 8 | — | remainder | 0.9 | 95 | 99.8 | 93.6 | 112 | 6.1 | 18 |
| 32 | 0.6 | 1 | 29 | 3 | 7 | — | remainder | 0.8 | 63 | 99.7 | 94.2 | 138 | 6.4 | 24 |
| 33 | 0.6 | 8 | 32 | 0.1 | 0.9 | — | remainder | 0.9 | 72 | 99.6 | 94.3 | 130 | 5.8 | 20 |
| 34 | 0.6 | 1 | 19 | 6 | 19 | — | remainder | 0.6 | 103 | 99.7 | 94.0 | 112 | 6.0 | 16 |
| 35 | 0.5 | 5 | 25 | 3 | 7 | — | remainder | 0.8 | 34 | 99.9 | 94.2 | 126 | 6.2 | 24 |
| 36 | 0.5 | 0.5 | 29.5 | 2 | 8 | — | remainder | 0.8 | 82 | 99.8 | 94.1 | 132 | 6.3 | 20 |
| 37 | 0.4 | 3 | 27 | 2 | 8 | — | remainder | 0.9 | 13 | 99.9 | 94.2 | 135 | 6.4 | 19 |
| 38 | 0.6 | 2 | 28 | 2 | 8 | — | remainder | 0.9 | 105 | 99.7 | 94.0 | 126 | 6.4 | 23 |
| 39 | 0.6 | 4 | 26 | 2 | 8 | — | remainder | 0.9 | 87 | 99.6 | 94.2 | 130 | 6.2 | 21 |

TABLE 6-continued

| | Composition (% by weight) | | | | | | | | | | | | | |
|---|---|---|---|---|---|---|---|---|---|---|---|---|---|---|
| | M (CNO) | | | ZrO$_2$ | | Metal oxides at grain boundary | Al$_2$O$_3$ | | | | | | | |
| | Average grain size | Within grains ($\mu$m) | At grain boundary | Within grains | At grain boundary | | Al$_2$O$_3$ | Average grain size ($\mu$m) | Internal stress (MPa) | Theoretical density ratio (%) | Hardness (H$_R$A) | Bending strength (kg/mm$^2$) | FT | Cutting time (min) |
| 40 Prior art cermets | 0.6 | 3 | 27 | 2 | 8 | — | remainder | 0.7 | 3 | 99.7 | 94.1 | 125 | 6.0 | 20 |
| 11 | 1.3 | — | 30 | — | — | 4 | remainder | 1.6 | 4 | 99.7 | 94.0 | 82 | 5.0 | 2[1] |
| 12 | 1.8 | — | 30 | — | — | 3 | remainder | 2.3 | 18 | 99.9 | 94.1 | 90 | 5.2 | 3[2] |
| 13 | 1.7 | — | 30 | — | — | 4 | remainder | 2.0 | 31 | 99.8 | 93.9 | 88 | 5.1 | 2[3] |

FT denotes "Fracture toughness (MN/m$^{3/2}$)"
[1],[3]chipped in 2 minutes
[2]fractured in 3 minutes TABLE 7-1a

| Coated ceramics of the invention | Blending composition of substrate | | | | |
|---|---|---|---|---|---|
| | TiCN | MgO | ZrO$_2$ | Y$_2$O$_3$ | Al$_2$O$_3$ |
| 1 | TiC$_{0.5}$N$_{0.5}$ | 20 | 0.5 | — | — | remainder |
| 2 | TiC$_{0.7}$N$_{0.3}$ | 30 | 0.5 | — | — | remainder |
| 3 | TiC$_{0.5}$N$_{0.5}$ | 30 | — | — | 0.5 | remainder |
| 4 | TiC$_{0.5}$N$_{0.5}$ | 30 | — | — | 0.5 | remainder |
| 5 | TiC$_{0.5}$N$_{0.5}$ | 30 | — | — | 0.5 | remainder |
| 6 | TiC$_{0.5}$N$_{0.5}$ | 30 | 0.5 | 2 | — | remainder |
| 7 | TiC$_{0.5}$N$_{0.5}$ | 30 | — | — | 0.5 | remainder |
| 8 | TiC$_{0.5}$N$_{0.5}$ | 30 | 0.5 | — | 0.5 | remainder |
| 9 | TiC$_{0.3}$N$_{0.7}$ | 30 | 0.5 | — | 0.5 | remainder |
| 10 | TiC$_{0.5}$N$_{0.5}$ | 30 | 0.5 | — | 0.5 | remainder |

TABLE 7-2a

| Comparative coated ceramics | Blending composition of substrate | | | | |
|---|---|---|---|---|---|
| | TiCN | MgO | Y$_2$O$_3$ | Al$_2$O$_3$ |
| 1 | TiC$_{0.5}$N$_{0.5}$ | 30 | 0.5 | — | remainder |
| 2 | TiC$_{0.5}$N$_{0.5}$ | 30 | 0.5 | — | remainder |
| 3 | TiC$_{0.5}$N$_{0.5}$ | 30 | 0.5 | — | remainder |
| 4 | TiC$_{0.5}$N$_{0.5}$ | 30 | 0.5 | — | remainder |
| 5 | TiC$_{0.5}$N$_{0.5}$ | 30 | 0.5 | — | remainder |
| 6 | TiC$_{0.5}$N$_{0.5}$ | 30 | — | 0.5 | remainder |
| 7 | TiC$_{0.5}$N$_{0.5}$ | 30 | — | 0.5 | remainder |
| 8 | TiC$_{0.5}$N$_{0.5}$ | 30 | — | 0.5 | remainder |
| 9 | TiC$_{0.5}$N$_{0.5}$ | 30 | — | 0.5 | remainder |
| 10 | TiC$_{0.3}$N$_{0.7}$ | 40 | 0.5 | 0.5 | remainder |

TABLE 7-1b

| | Hard coating | | | | | | | | | | | |
|---|---|---|---|---|---|---|---|---|---|---|---|---|
| | 1st layer | | | 2nd layer | | | 3rd layer | | | 4th layer | | |
| Coated ceramics of the invention | Composition | Average layer thickness ($\mu$m) | Average grain size (Å) | Composition | Average layer thickness ($\mu$m) | Average grain size (Å) | Composition | Average layer thickness ($\mu$m) | Average grain size (Å) | Composition | Average layer thickness ($\mu$m) | Average grain size (Å) |
| 1 | TiCN | 0.5 | 200 | TiN | 1.5 | 200 | — | — | — | — | — | — |
| 2 | TiCN | 0.5 | 200 | TiN | 1.5 | 200 | — | — | — | — | — | — |
| 3 | TiN | 2.0 | 300 | — | — | — | — | — | — | — | — | — |
| 4 | TiC | 2.0 | 200 | TiCN | 1.0 | 200 | TiN | 2.0 | 250 | — | — | — |
| 5 | TiN | 0.5 | 200 | TiC | 1.5 | 200 | TiCN | 1.5 | 200 | TiN | 1.5 | 200 |
| 6 | TiC | 1.0 | 200 | TiCN | 2.0 | 200 | TiN | 3.0 | 200 | — | — | — |
| 7 | TiC | 5.0 | 150 | — | — | — | — | — | — | — | — | — |
| 8 | TiCN | 2.0 | 150 | TiC | 2.0 | 150 | — | — | — | — | — | — |
| 9 | TiCN | 3.0 | 150 | — | — | — | — | — | — | — | — | — |
| 10 | TiCN | 1.0 | 200 | TiN | 2.0 | 200 | — | — | — | — | — | — |

TABLE 7-2b

| | Hard coating | | | | | | | | | | | |
|---|---|---|---|---|---|---|---|---|---|---|---|---|
| | 1st layer | | | 2nd layer | | | 3rd layer | | | 4th layer | | |
| Comparative coated ceramics | Composition | Average layer thickness ($\mu$m) | Average grain size (Å) | Composition | Average layer thickness ($\mu$m) | Average grain size (Å) | Composition | Average layer thickness ($\mu$m) | Average grain size (Å) | Composition | Average layer thickness ($\mu$m) | Average grain size (Å) |
| 1 | TiCN | 0.5 | 400 | TiN | 1.5 | 400 | — | — | — | — | — | — |
| 2 | TiCN | 0.5 | 450 | TiN | 1.5 | 450 | — | — | — | — | — | — |
| 3 | TiN | 2.0 | 500 | — | — | — | — | — | — | — | — | — |
| 4 | TiC | 2.0 | 400 | TiCN | 1.0 | 400 | TiN | 2.0 | 400 | — | — | — |
| 5 | TiN | 0.5 | 400 | TiC | 1.5 | 400 | TiCN | 1.5 | 400 | TiN | 1.5 | 450 |
| 6 | TiC | 1.0 | 500 | TiCN | 2.0 | 400 | TiN | 3.0 | 500 | — | — | — |
| 7 | TiC | 5.0 | 400 | — | — | — | — | — | — | — | — | — |
| 8 | TiCN | 2.0 | 500 | TiC | 2.0 | 500 | — | — | — | — | — | — |
| 9 | TiCN | 3.0 | 500 | — | — | — | — | — | — | — | — | — |
| 10 | TiCN | 1.0 | 400 | TiN | 2.0 | 400 | — | — | — | — | — | — |

TABLE 8

| | Interrupted cutting tests | | Continuous cutting tests | |
| --- | --- | --- | --- | --- |
| | Flank wear width (mm) | Face wear depth (μm) | Flank wear width (mm) | Face wear depth (μm) |
| Coated ceramics of the invention | | | | |
| 1 | 0.23 | 52 | 0.26 | 60 |
| 2 | 0.20 | 49 | 0.23 | 56 |
| 3 | 0.21 | 50 | 0.24 | 54 |
| 4 | 0.18 | 41 | 0.21 | 45 |
| 5 | 0.19 | 43 | 0.21 | 48 |
| 6 | 0.18 | 40 | 0.20 | 44 |
| 7 | 0.20 | 45 | 0.21 | 49 |
| 8 | 0.24 | 54 | 0.25 | 60 |
| 9 | 0.22 | 56 | 0.26 | 62 |
| 10 | 0.23 | 55 | 0.26 | 59 |
| Comparative coated cermets | | | | |
| 1 | chipped in 12 minutes | | chipped in 7 minutes | |
| 2 | chipped in 11 minutes | | chipped in 8 minutes | |
| 3 | chipped in 13 minutes | | chipped in 7 minutes | |
| 4 | chipped in 12 minutes | | chipped in 6 minutes | |
| 5 | chipped in 11 minutes | | chipped in 8 minutes | |
| 6 | chipped in 11 minutes | | chipped in 9 minutes | |
| 7 | chipped in 13 minutes | | chipped in 8 minutes | |
| 8 | chipped in 9 minutes | | chipped in 8 minutes | |
| 9 | chipped in 10 minutes | | chipped in 7 minutes | |
| 10 | chipped in 13 minutes | | chipped in 7 minutes | |

What is claimed is:

1. An $Al_2O_3$-based ceramic consisting essentially of:

5% to 50% by weight of a hard dispersed phase composed of at least one compound which is selected from the group consisting of metal carbide, metal nitride, metal carbonitride, metal oxy-carbide, metal oxynitride and metal carbo-oxynitride, and is represented by M(CNO), wherein M is at least one metal selected from the group consisting of Ti, Zr and Hf;

no greater than 25% by weight of $ZrO_2$; and balance $Al_2O_3$ matrix containing an additive dissolved in the $Al_2O_3$ grains so as to form a solid solution therewith, said additive being contained in an amount of 0.01% to 12% by weight with respect to the $Al_2O_3$ matrix and being composed of at least one oxide of an element selected from the group consisting of Y, Mg, Cr, Ni, Co and rare earth elements;

said $Al_2O_3$ grains having an average grain size of no larger than 1.0 μm while said hard phase constituent has an average grain size of no larger than 0.6 μm, wherein said hard phase constituent is present at the grain boundary of and within the $Al_2O_3$ grains and the resulting $Al_2O_3$-based ceramic having a three-point bending strength of at least 112 kg/mm².

2. An $Al_2O_3$ based ceramic according to claim 1, wherein said compound M(CNO) of said hard dispersed phase is the one represented by M($C_xN_yO_z$), wherein $0.95 \leq x+y+z \leq 1$, $5/95 \leq x/y \leq 70/30$ and $0 \leq z \leq 0.1$.

3. An $Al_2O_3$ based ceramic according to claim 2, wherein residual compressive stress exerted on said $Al_2O_3$ matrix is no less than 20 MPa.

4. An $Al_2O_3$ based ceramic according to claim 2, wherein said hard phase constituent is composed of at least one compound selected from the group consisting of titanium carbide, titanium nitride and titanium carbonitride, and is represented by Ti($C_xN_y$), wherein $5/95 \leq x/y \leq 70/30$.

5. An $Al_2O_3$ based ceramic according to claim 2, further comprising a hard coating vapor-deposited thereon, said hard coating having a thickness of 0.3 to 30 μm and being comprised of one or more layers of at least one composition selected from the group consisting of carbide, nitride, carbo-nitride, oxy-carbide of titanium, and $Al_2O_3$.

6. An $Al_2O_3$ based ceramic according to claim 4, further comprising a hard coating vapor-deposited thereon, said hard coating having a thickness of 0.3 to 30 μm and being comprised of one or more layers of at least one composition selected from the group consisting of carbide, nitride, carbo-nitride, oxy-carbide of titanium, and $Al_2O_3$.

7. An $Al_2O_3$ based ceramic according to claim 1, wherein said additive is dissolved in said $Al_2O_3$ grains so as to form a solid solution herewith.

8. An $Al_2O_3$-based ceramic consisting of:

5% to 50% by weight of a hard dispersed phase composed of at least one compound which is selected from the group consisting of metal carbide, metal nitride, metal carbonitride, metal oxy-carbide, metal oxynitride and metal carbo-oxynitride, and is represented by M(CNO), wherein M is at least one metal selected from the group consisting of Ti, Zr and Hf;

no greater than 25% by weight of $ZrO_2$; and balance $Al_2O_3$ matrix containing an additive dissolved in the $Al_2O_3$ grains so as to form a solid solution therewith, said additive being contained in an amount of 0.01% to 12% by weight with respect to the $Al_2O_3$ matrix and being composed of at least one oxide of an element selected from the group consisting of Y, Mg, Cr, Ni, Co and rare earth elements;

said $Al_2O_3$ grains having an average grain size of no larger than 1.0 μm while said hard phase constituent has an average grain size of no larger than 0.6 μm, wherein said hard phase constituent is present at the grain boundary of and within the $Al_2O_3$ grains and the resulting $Al_2O_3$-based ceramic having a three-point bending strength of at least 112 kg/mm².

9. An aluminum based ceramic as defined in claim 1, wherein the $ZrO_2$ is present in an amount of 1 to 25% by weight.

10. An $Al_2O_3$-based ceramic consisting of:

5% to 50% by weight of a hard dispersed phase composed of at least one compound which is selected from the group consisting of metal carbide, metal nitride, metal carbonitride, metal oxycarbide, metal oxynitride and metal carbo-oxynitride, and is represented by M(CNO), wherein M is at least one metal selected from the group consisting of Ti, Zr and Hf;

1 to 25% by weight of $ZrO_2$; and balance $Al_2O_3$ matrix containing an additive dissolved in the $Al_2O_3$ grains so as to form a solid solution therewith, said additive being contained in an amount of 0.01% to 12% by weight with respect to the $Al_2O_3$ matrix and being composed of at least one oxide of an element selected from the group consisting of Y, Mg, Cr, Ni, Co and rare earth elements;

said $Al_2O_3$ grains having an average grain size of no larger than 1.0 μm while said hard phase constituent has an average grain size of no larger than 0.6 μm, wherein said hard phase constituent is present at the grain boundary of and within the $Al_2O_3$ grains and the resulting $Al_2O_3$-based ceramic having a three-point bending strength of at least 112 kg/mm².

* * * * *